Figure 1:
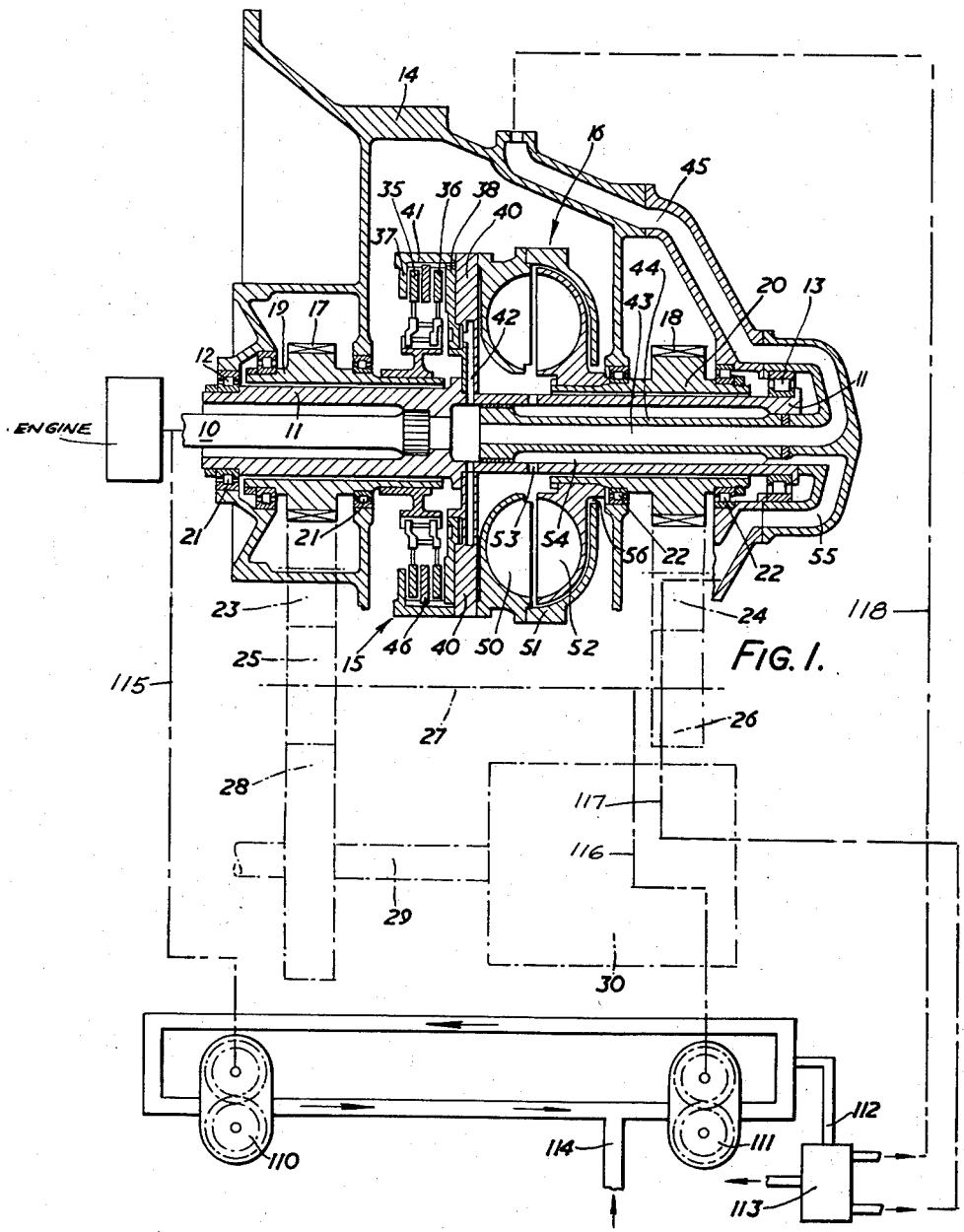

INVENTORS
G. H. MURRAY
A. L. CATFORD

United States Patent Office 2,970,498
Patented Feb. 7, 1961

2,970,498
POWER TRANSMISSION MECHANISM INCLUDING HYDRAULIC AND FRICTION CLUTCHES

George H. Murray, Pinner, and Adrian L. Catford, Hampton, England, assignors to D. Napier & Son Limited, London, England, a British company Filed Jan. 21, 1958, Ser. No. 710,271

Claims priority, application Great Britain Jan. 30, 1957

5 Claims. (Cl. 74—731)

This invention relates to power transmission mechanism of the kind comprising a hydraulic coupling and a friction clutch connected in parallel between the input and output shafts of the mechanism.

The invention is designed primarily for use between a high speed diesel engine having a low moment of inertia, and a machine to be driven thereby, such as a compressor or pump, having a high moment of inertia. In such applications a clutch is normally necessary at starting between the engine and the power absorber to allow slip until the power absorber has been accelerated to a speed comparable to that of the engine, or to the geared output of the engine, even though the power absorber may not be under load. A friction clutch of practical dimensions is only capable of transmitting limited power at high rates of relative slip and is liable to burn out if the slip continues for any appreciable period. A hydraulic coupling is capable of transmitting torque at high rates of slip for considerable periods but such a coupling can not provide a rigid transmission, and slip with accompanying power losses must occur.

Preferably therefore a hydraulic coupling is used to transmit the power at high rates of slip and the drive is then transferred, when the slip is relatively low, to the friction coupling to provide eventually a rigid power path.

According to the present invention power transmission mechanism of the kind referred to includes means responsive to the speeds of the input and output shafts and arranged to engage and/or disengage the friction clutch automatically at a predetermined relationship between the speeds of the input and output shafts.

According to one preferred feature of the invention the mechanism may include means sensitive to the difference in speeds between the input and output shafts and arranged to engage the friction clutch automatically when this speed difference drops below a predetermined value.

The speed sensitive mechanism may comprise a differential gear system, two sides of which are connected respectively to the input and output shafts, while the third side is connected to an operating member, the arrangement being such that the two first mentioned sides of the system are driven in opposite directions by the input and output shafts so that when these shafts are rotating at the same speed the operating member is stationary, and including operating mechanism between the operating member and the friction clutch arranged to engage this clutch when the speed of the operating member falls below a predetermined value.

The operating mechanism will preferably incorporate a speed governor device arranged to engage the friction clutch when the rotational speed of the operating member drops below a predetermined value.

In one arrangement the speed governor may comprise a hydraulic pump driven by the operating member of the differential mechanism, the output of this pump being arranged to act on a movable piston element against an opposing spring, and servo valve mechanism controlled by this piston element and arranged to actuate hydraulic servo mechanism controlling the engagement of the friction clutch.

In an alternative arrangement the speed governor device comprises a mechanical centrifugal governor driven by the operating member of the differential and arranged to operate servo mechanism acting to engage the friction clutch. In yet another alternative the speed governor device may comprise a dynamo-electric generator driven by the operating member of the differential and connected to a solenoid or electric motor arranged to actuate mechanism controlling the engagement of the friction clutch.

According to another preferred feature of the invention the mechanism comprises a positive displacement hydraulic pump driven by each of the input and output shafts, these two pumps being arranged in series in a closed hydraulic circuit, and including means sensitive to pressure changes in the circuit between the two pumps and connected to mechanism controlling the engagement of the friction clutch.

The relationship between the speeds of the input and output shafts at which the friction clutch is to be engaged or disengaged may be based upon the speed ratio between these shafts, that is to say on the percentage slip. Thus according to another feature of the invention the mechanism may include means sensitive to the ratio of the speed of the input and output shafts and arrange to engage the friction clutch automatically when this speed ratio reaches a predetermined value.

The invention may be performed in various different ways but some specific embodiments will now be described by way of example as applied to the transmission between a high speed light weight diesel engine and a heavy compressor having a large moment of inertia.

In the accompanying drawings Figure 1 is a diagrammatic illustration of the transmission system with hydraulic coupling and friction clutch shown in sectional side elevation.

Figure 2:
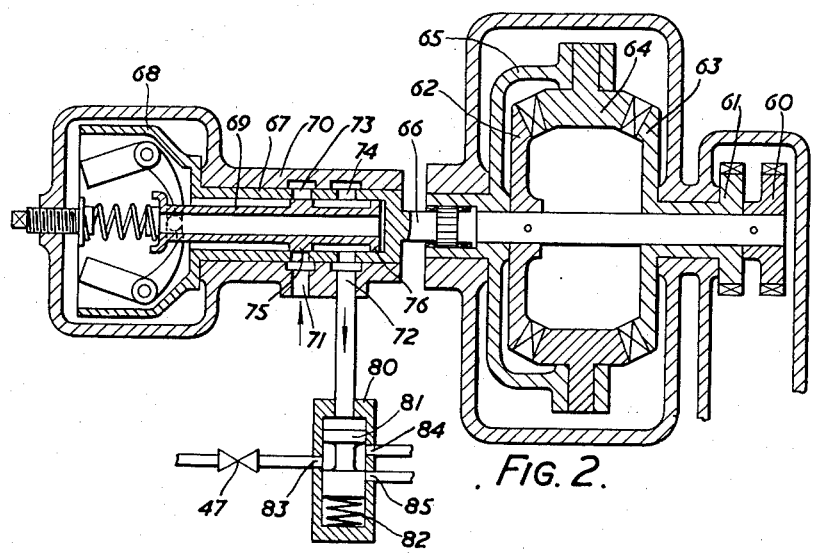
Figure 3:
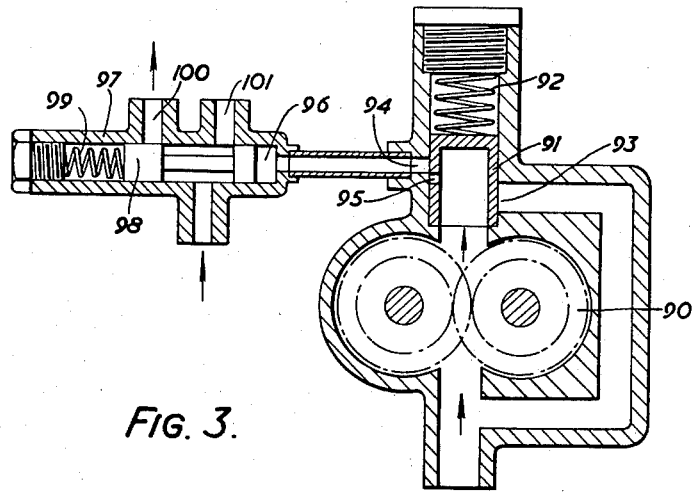

Figure 2 is a sectional side elevation through an automatic clutch control mechanism, Figure 3 is a similar view of Figure 2 of an alternative clutch control mechanism.

The transmission mechanism illustrated in Figure 1 comprises a driving shaft 10, connected to the crankshaft of a high speed light weight diesel engine (not shown), and connected also to a hollow clutch input shaft 11 mounted in bearings 12, 13 at opposite ends of a casing 14. The clutch input shaft 11 is connected through a friction clutch 15 and a hydraulic coupling 16 to pinions 17, 18 mounted on sleeves 19, 20, which surround the shaft 11 without making contact therewith, and which are independently supported in bearings 21, 22. The pinions 17, 18 mesh respectively with idler pinions 23, 24, which in turn mesh with pinions 25, 26 rigidly mounted on a layshaft 27, the pinion 25 meshing also with a pinion 28 which is connected to a common output shaft 29 driving a compressor 30 having a large moment of inertia. The friction clutch 15 and the hydraulic coupling 16 are thus connected in parallel between the driving shaft 10 and the output shaft 29 and compressor 30.

The friction clutch 15 comprises two annular driving friction plates 35, 36 sandwiched between a fixed friction driven plate 37 and a movable driven plate 38. There is an axially floating driven plate 46 between the two driving plates 35, and 36. The driving plates 35, 36 are splined to a sleeve 39 to be capable of free movement thereon in an axial direction, the sleeve 39 being rigidly connected to the sleeve 19 on which is mounted pinion 17. The fixed driven plate 37 is rigidly connected through a cylindrical flange 41 to a radial flange 40 which is secured to the input shaft 11. The movable driven plate 38 acts as an annular hydraulic piston and is splined to the flange 41, as is the driven plate 46, and means are provided for admitting hydraulic fluid under pressure between the driven plate 38 and the flange 40, via a radial drilling 42 and a central axial pressure duct 43 within a stationary hollow spigot 44 secured to the casing 14 and entering the hollow end of the input shaft 11. The duct 43 is connected to a pressure conduit 45, and it will be seen that when pressure fluid is supplied through this conduit the movable clutch plate 38 will be urged to the left in Figure 1, thus providing frictional contact between the plates 37, 35, 46, 36, 38, and hence energising the friction clutch between input shaft 11 and pinion 17.

The hydraulic coupling 16 comprises an input member 50 rigidly secured to the flange 40, which is attached to the input shaft 11, this member 50 being secured also to half-casing member 51 defining an annular hydraulic chamber. Adjacent the member 50 and within the chamber is mounted an output member 52 which is rigidly connected to the sleeve 20 on which is mounted pinion 18.

Hydraulic fluid is supplied to the chamber of the hydraulic coupling via a series of radial drillings 53 in the shaft 11 and an annular supply passage 54 surrounding the spigot 44. The passage 54 is connected to an external supply conduit 55. A permanent drain or bleed passage from the hydraulic chamber exists at the inner edge 56 of the casing 51. It will be seen that when hydraulic fluid is supplied through conduit 55 the coupling chamber will be filled, and the hydraulic coupling will transmit torque between the input shaft 11 and the pinion 18. When the supply of fluid is interrupted the chamber will empty, and the drive will be interrupted.

The friction clutch 15 and hydraulic coupling 16 are automatically controlled by the mechanism illustrated in Figure 2. The mechanism comprises two pinions 60, 61, connected respectively by gearing (not shown) to the input shaft 11 and to the layshaft 27, so as to be driven in opposite directions. The pinions 60, 61 are connected independently of one another to a pair of coaxial bevel crown wheels 62, 63 forming part of a differential gear box. Engaging both of these bevel crown wheels 62, 63 are a series of bevel planet gears 64 mounted for rotation on a spider 65 which is capable of rotating about the common axis of the crown wheels, this spider constituting the differential operating member. It will be seen that when the input shaft 11 and layshaft 27 are rotating at the same speed, that is to say with no slip, the spider 65 will be stationary. At other times the speed of rotation of the spider will be proportional to the difference between the speeds of rotation of the two shafts 11 and 27.

The spider 65 is connected to a shaft 66 which is in turn connected through a sleeve 67 to a mechanical centrifugal governor 68, the weights of which bear on an axially movable inner sleeve 69. The two sleeves 67, 69 lie within a cylindrical valve casing 70 provided with fluid inlet and outlet ports 71, 72. The outer sleeve 67 is formed with a series of radial ports 73, 74, and the inner sleeve is formed with two control lands 75, 76. The sleeves therefore combine to act as a fluid control valve to adjust the flow of fluid in response to the speed of rotation of the spider 65, and hence to the speed difference between the input shaft 11 and the layshaft 27.

The fluid outlet port 72 is connected to one end of a hydraulic servo control valve 80, and acts on a valve spindle 81, against a spring 82. The valve spindle controls the flow through this valve from an inlet port 83 to outlet ports 84, 85, the arrangement being such that port 84 is progressively closed and port 85 opened when the pressure of fluid delivered through port 72 rises.

Port 84 is connected to conduit 45, which supplies pressure fluid to energise the friction clutch 15. Port 85 is connected to conduit 55 which supplies fluid to fill the hydraulic coupling 16. A shut-off valve 47 is provided in the fluid supply pipe leading to port 83, which can be closed to prevent engagement of the friction clutch 15 and the hydraulic coupling 16 if required.

When there is an appreciable speed difference between input shaft 11 and layshaft 27 the inner sleeve 69 associated with governor 68 is moved to the left in Figure 2, and the valve spindle 81 is depressed, thus shutting off the supply of fluid to the friction clutch and energising the hydraulic coupling. When the speed difference falls below a predetermined value the sleeve 69 moves to the right, closing outlet port 72 as shown in Figure 2, and valve spindle 81 rises, shutting off the supply of fluid to the hydraulic coupling, and admitting fluid to energise the friction clutch.

In the alternative arrangement illustrated in Figure 3, the centrifugal governor 68 of Figure 2 is replaced by a hydraulic system. The spider 65 is connected to drive a gear type hydraulic displacement pump 90, the output of which acts on a movable piston element 91 against a compression spring 92 and this piston element is so designed that when the output from the pump rises the spring is compressed and a port 93 is opened to allow the fluid from the pump to escape and to return to the input side of the pump. Under these same conditions the piston opens a valve port 94 cooperating with a drilling 95 in the piston and leading from the high pressure side of the pump to a chamber 96 at one end of a simple two-way servo control valve 97 incorporating a shuttle valve 98 and corresponding to valve 80 in the previous example. The valve has an inlet port 102 connected to a servo pressure fluid supply and outlet ports 100, 101, connected respectively to the conduits 55 and 45, associated respectively with the hydraulic and friction clutches.

When the output from the gear pump 90 falls due to a drop in the speed of the spider 65, the piston element 91 returns under the action of the spring 92 and closes the port 94 as shown in Figure 3. The shuttle valve 98 is thus moved by the spring 99 to open the port 101 and allow pressure fluid from port 102 to be admitted to the operating cylinder of the friction clutch so as to engage this clutch. At the same time the port 100 is closed to empty the hydraulic coupling.

In yet another alternative illustrated in Figure 4 the input and output shafts 11 and 27 are connected by conventional power transmission means, diagrammatically represented by the chain lines 115 and 116, respectively to hydraulic gear type positive displacement pumps 110, 111 arranged in series in a closed hydraulic circuit. A point in this circuit between the two pumps is connected via a conduit 112 to an operating chamber including a pressure relief valve at one end of a hydraulic servo valve 113 arranged to actuate the friction clutch and hydraulic coupling by admission of hydraulic fluid through the conduits 117 and 118, respectively, in the same manner as described above with reference to Figures 2 and 3. The pressure at any point in the circuit between the two pumps will of course depend upon the relative speeds of rotation of the pumps and hence on the relationship between the speeds of the input and output shafts. In the present example this relationship will be the ratio between the speeds of the pumps 110, 111, and hence the ratio between the speeds of shafts 11 and 27. Supply means 114 are also provided for admitting extra make-up fluid to the circuit between the pumps 110, 111 on the opposite side of the circuit, or for allowing excess fluid to escape therefrom.

It will be appreciated that the mechanism may also operate as an automatic safety clutch. Thus if the "stalled" torque of the hydraulic coupling (the maximum torque which it can transmit) is less than the "stalled" torque of the engine (the torque which will stall the engine), the hydraulic clutch will merely slip if the driven member should seize while it is being started, and the friction clutch will not engage.

If the maximum torque transmission value of the friction clutch is also less than that of the stalled torque of the engine, the friction clutch will also slip if the driven member should seize or become heavily over-loaded in normal operation, and the automatic mechanism will then automatically disengage the friction clutch.

What we claim as our invention and desire to secure by Letters Patent is:

1. Power transmission mechanism for starting a load from an engine comprising an input shaft, an output shaft, a hydraulic coupling connecting said input and output shafts, said coupling being of the type in which the input and output torques are substantially equal to each other at different rotational speeds of the said shafts, a friction clutch connecting said input and output shafts in parallel with said hydraulic coupling, speed responsive means responsive to the relative speeds of said input and output shafts, friction clutch actuating means, and an operative connection between said speed responsive means and said friction clutch actuating means to initiate the engagement of said friction clutch automatically when the speed of said output shaft is raised to have a predetermined relationship with the speed of said input shaft as sensed by said speed responsive means, said speed responsive means being responsive to a difference in speeds between said input and output shafts and influencing said friction clutch operating means to engage said friction clutch when said difference in speed falls below a predetermined value, said speed responsive means comprising a differential mechanism having first and second input members and an output member, said first and second input members cooperating with said output member whereby rotation of said first and second input member in opposite directions at the same speed holds said output member stationary while a difference in rotational speeds of said input members produces rotation of said output member proportional to said difference, a connection between said input shaft and said first input member of said differential mechanism, a connection between said output shaft and said second input member of said differential mechanism, and a connection between said output member and said operative connection between said speed responsive means and said friction clutch actuating means.

2. Power transmission mechanism according to claim 1 in which said operative connection incorporates a speed governor device, said speed governor device influencing said friction clutch actuating means to initiate engagement of said friction clutch upon the speed of said output member of said differential mechanism falling to a predetermined value.

3. Power transmission mechanism according to claim 2 in which said speed governor device comprises a hydraulic pump driven by said output member of said differential mechanism and having an input side and an output side, said operative connection includes a piston element movable in a cylinder, a connection between said output side of said hydraulic pump and one end of said cylinder, and a spring acting against said movable piston element opposite said connection from said hydraulic pump, the valve device being controlled by said movable piston element.

4. Power transmission mechanism according to claim 2 in which said speed responsive means comprises a positive displacement hydraulic pump driven by said input shaft, a positive displacement hydraulic pump driven by said output shaft, a closed hydraulic circuit connecting said two pumps, and means sensitive to pressure changes in said closed hydraulic circuit at a point between said two pumps for influencing said friction clutch actuating means.

5. Power transmission mechanism for starting a load from an engine comprising an input shaft, an output shaft, a hydraulic coupling connecting said input and output shafts, said coupling being of the type in which the input and output torques are substantially equal to each other at different rotational speeds of said shafts, a friction clutch connecting said input and output shafts in parallel with said hydraulic coupling, speed responsive means responsive to the relative speeds of said input and output shafts, friction clutch actuating means, and an operative connection between said speed responsive means and said friction clutch actuating means to initiate the engagement of said friction clutch automatically when the speed of said output shaft is raised to have a predetermined relationship with the speed of said input shaft as sensed by said speed responsive means, said friction clutch actuating means being hydraulically operated and in which said operative connection comprises a valve device positioned between a source of hydraulic fluid on the one hand and the hydraulic coupling and the hydraulically operated means on the other hand, and arranged to interrupt the supply of fluid from the source to the coupling and initiate the supply of fluid from the source to the hydraulically operated means when the predetermined relationship between the output and input shaft speeds is achieved.

References Cited in the file of this patent
UNITED STATES PATENTS

| | | |
|---|---|---|
| 2,168,863 | DeLavand | Aug. 8, 1939 |
| 2,374,303 | Osborne | Apr. 24, 1945 |
| 2,651,948 | Price | Sept. 15, 1953 |
| 2,672,767 | Schneider | Mar. 23, 1954 |
| 2,699,074 | Livezey et al. | Jan. 11, 1955 |